United States Patent Office 3,373,088
Patented Mar. 12, 1968

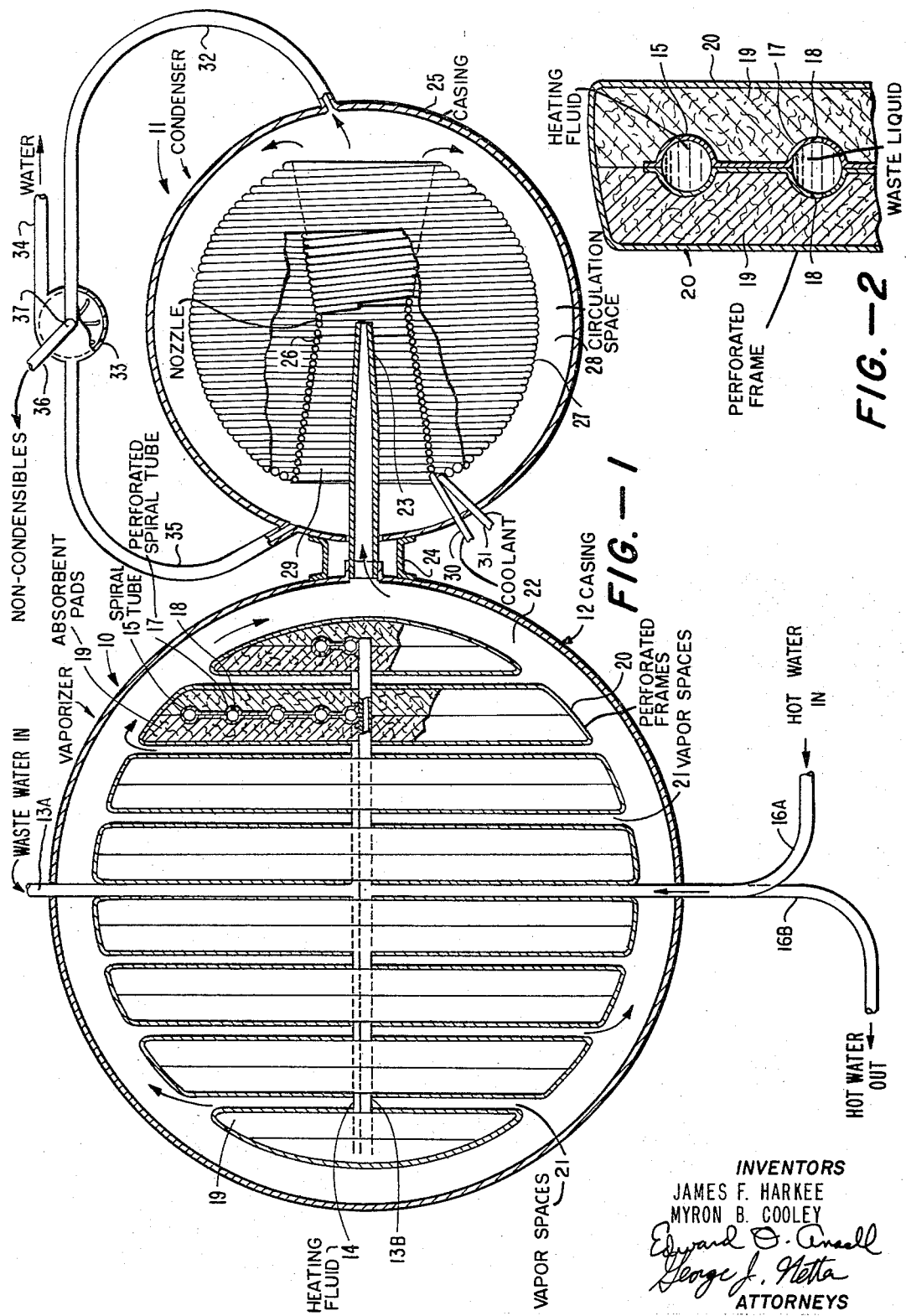

3,373,088
ATTITUDE-INDEPENDENT DISTILLATION
APPARATUS
James F. Harkee, Glendora, and Myron B. Cooley,
Pomona, Calif., assignors to Aerojet-General Corporation, El Monte, Calif., a corporation of Ohio
Filed Jan. 8, 1965, Ser. No. 424,300
8 Claims. (Cl. 202—185)

This invention relates to distillation apparatus and more particularly to such apparatus specifically designed to obtain pure water from waste water.

The novel apparatus of the invention is specifically designal for use in manned space vehicles for which use, a number of special requirements have to be met, such as operation under modified gravity conditions and independence of attitude, minimum weight and volume but maximum reliability and others.

It is accordingly an object of the invention to provide distillation apparatus capable of producing pure water from waste water or urine which utilizes a minimum of energy which can readily be furnished by the pump means provided for carrying out various other functions in a manned space craft.

A further object of the invention is to provide distillation apparatus with no major parts comprising moving mechanism so that maintenance is reduced to a minimum and reliability of operation is at a maximum.

Another object of the invention is to provide apparatus of the kind described wherein absorbent elements into which the liquid to be treated is fed, may be withdrawn when necessary for disposal and replaced by fresh elements.

Another object is to provide distillation apparatus of the kind referred to of small size and weight and of compact arrangement.

Still further objects and features of the invention will hereinafter appear from the following description read together with the accompanying drawings in which:

FIGURE 1 is a longitudinal sectional view, partially schematic in form, showing an apparatus constructed in accordance with the present invention; and FIGURE 2 is an enlarged fragmentary longitudinal sectional view showing a portion of a vapor generating unit which is a component of the apparatus shown in FIGURE 1.

Referring more specifically to the drawings, reference numeral 10 indicates generally the vaporizer unit generating vapor from the waste water or other liquid to be distilled and the numeral 11 indicates generally the condenser unit for obtaining pure water from the vapor distilled from the waste water.

The vaporizer comprises a casing 12 preferably formed of parts which may be disassembled to permit cleaning of the casing and removal of absorbent elements contained therein for cleaning or replacement. The casing 12 may be of any convenient shape, but is preferably spherical, as shown.

Waste water is supplied from a feed tube 13A to a feed manifold 13B extending axially in the casing 12. Heating medium, in this case water at about 120° F., is fed into the casing 12 through a heating fluid inlet conduit 16A to a manifold 14 which is connected through a plurality of sets of spiral tubes 15 with a heating fluid outlet conduit 16B. The waste water manifold 13B is connected to a plurality of spiral tubes 17 which comprise spiral waste water tubes. The successive turns of each respective spiral waste water tube 17 are interposed with or alternate with the successive turns of a respective spiral heating tube 15 which corresponds thereto. Thus, it will be understood that a respective spiral waste water tube 17 is paired with a corresponding spiral heating tube 15 to define a series of radially arranged spiral turns which alternately form portions of the spiral heating tube 15 and the spiral waste water tube 17. The walls of the spiral tubes 17 are drilled with holes 18 to provide for flow of the waste water out of the spirals. The ends of tubes 17 not connected to manifold 13B are closed. Each of the paired spiral heating tubes 15 and the spiral waste water tubes 17 is so arranged that the alternating turns of the respective tubes 15 and 17 are radially spaced apart to receive slabs or pads 19 of absorbent material which extend therebetween so as to substantially enclose each of the paired spiral tubes 15–17. As shown in FIGURE 2, connecting web portions may be provided between the adjacent turns of the paired spiral tubes 15, 17. The absorbent pads 19 are held in position for instance by light frames of perforated metal 20 to leave channels 21 for the free escape of the moist vapors from the absorbent material into the spaces between the pads 19 and into the circumscribing space 22 around the interior surface of the case 12.

The moist vapor from the vapor generating unit 10 is directed into the condenser 11 through the relatively small diameter sonic nozzle 23. Condenser 11 is shown connected to unit 10 by tubular member 24.

The condenser 11 comprises a spherical case 25 containing a continuous length of tubing formed into a nozzle 26 co-axial with nozzle 23 which discharges into the throat of nozzle 26. The tubing forming the nozzle 26 is wound from the outlet end of said nozzle to form a spherical wall 27 spaced from the inner surface of case 25 to provide a circulation space 28 leading from the outlet end of nozzle 26 to its entry or inner end 29. A cooling medium such as water at about 40° F. is led into the nozzle coil winding through feed pipe 30 and exhausted through outlet pipe 31 connected to the end of the tubing forming the spherical wall 27.

The vapor rising from the nozzle 26 will comprise some water particles, and the space 28 will be occupied both by cooled water vapor particles and product water. A small fraction of the water particles and product water circulation in space 28 because of the ejector action of nozzle 23 and suction effect is withdrawn through a small diameter by-pass 32 and directed into the eye of electrically driven centrifugal pump 33, with product liquid being discharged through tangential delivery pipe 34. Liquid not discharged is returned through pipe 35 downstream to the entry 29 of nozzle 26. Non-condensable gases are allowed to escape from the centrifugal pump through pipe 36 connecting with the eye 37 of the pump 33.

The waste water to be distilled may be fed into the vaporizer unit 11 in any suitable manner, for instance, from a container (not shown) connected to pipe 13A and put under pressure by a rubber balloon in the container which may be blown up after a load of waste water has been put in the container.

OPERATION

It is pointed out that the apparatus described and shown by way of illustration was designed and tested to provide the needs of a two-man capsule to produce clear water from waste water and urine at the rate of about one lb. per hour. The apparatus utilized a flow of about twelve gallons of circulated water per hour at about 40° F. for cooling and at about 120° F. for heating.

The power required for operation including the centrifugal fan motor and small refrigerator, using a halogenated hydrocarbon as a refrigerant, for cooling the circulated water was about 120 watts which could be readily supplied by a central power package or heat pump required to operate the various mechanisms in the capsule.

When the output drops below permissible limits due to deposition of impurities in the vaporizer pads, the vaporizer case may be readily opened and the pads removed and replaced by fresh ones.

A preferred embodiment of the invention has been hereinbefore described and shown by way of illustration but not by way of limitation of the invention, since various modifications may be made in said embodiment without departing from the scope of the invention as defined by the appended claims.

We claim:
1. Distillation apparatus for obtaining pure water from waste water and like contaminated liquids comprising:
 a vaporizer unit generating vapor from the contaminated liquid,
 means for circulating heating medium through said vaporizer unit, and
 a vapor delivering nozzle leading heated vapor out of said vaporizer unit;
 a condenser unit comprising a casing associated with said vaporizer unit and having a nozzle arranged therein, the vapor delivering nozzle discharging vapor into the throat of the nozzle in the condenser casing,
 an internal wall within said casing and disposed outwardly with respect to the nozzle in the casing in surrounding relation thereto,
 means associated with said nozzle in the casing and said internal wall within the casing for circulating cooling medium within said casing so as to cool said nozzle in the casing and said internal wall within the casing, and
 said internal wall within said casing cooperating therewith to define a circulation path therebetween from the outlet end to the inlet end of said nozzle in the casing for the vapor flowing through said nozzle in the casing and effective to cause condensation of the said vapor; and
 means effective to continuously withdraw some of the condensed vapor from said condenser unit and deliver it as liquid to storage, to vent non-condensed vapor, and to return undelivered condensed vapor to said condenser unit.

2. Distillation apparatus as set forth in claim 1, and in which said vaporizer unit further comprises:
 a casing,
 a feed tube delivering the contaminated liquid to be treated into said casing of the vaporizer unit,
 a plurality of perforated tubes mounted in said casing to which contaminated liquid is delivered from said feed tube,
 said means for circulating heating medium through said vaporizer unit comprising a plurality of tubes for the circulation of heating medium therein and being respectively disposed in proximity to a corresponding perforated tube,
 absorbent material positioned in contact with said perforated tubes and said heating medium circulating tubes, said absorbent material being wetted by liquid escaping from said perforated tubes, and
 said absorbent material coperating with the casing of said vaporizer unit to define therewith a passage in the casing of said vaporizer unit communicating with said vapor delivering nozzle and into which vapor from the wetted absorbent material may flow to the vapor delivering nozzle.

3. Distillation apparatus for obtaining pure water from waste water and like contaminated liquids comprising:
 a vaporizer unit generating vapor from the contaminated liquid, said vaporizer unit including a casing,
 a feed tube delivering the contaminated liquid to be treated into said casing of the vaporizer unit,
 a first manifold extending through said casing of the vaporizer unit and connected to said feed tube,
 a plurality of spirally wound radially extending perforated tubes mounted in said casing of the vaporizer unit and connected at axially spaced intervals to said first manifold to receive contaminated liquid therefrom, said perforated tubes being closed at the end not connected to said first manifold,
 a plurality of spirally wound radially extending tubes respectively corresponding to said plurality of spirally wound radially extending perforated tubes, each of said tubes being concentric with a corresponding perforated tube and defining therewith a series of radially spaced spiral turns alternately forming portions of the tube and the perforated tube,
 an inlet conduit extending into said casing of the vaporizer unit for admitting a heating medium thereinto,
 a second manifold for heating medium connected to said inlet conduit and extending through said casing of the vaporizer unit,
 an outlet conduit extending from said casing of the vaporizer unit and connected to said second manifold,
 each of said tubes being connected at its opposite ends to said second manifold, such that heating medium may be circulated in said plurality of spirally wound radially extending tubes in proximity to said plurality of spirally wound radially extending perforated tubes by entering into the casing of the vaporizer unit through said inlet conduit and being subsequently discharged from the casing of the vaporizer unit through said outlet conduit after passing through the tubes,
 each of the tubes for heating medium and the respective perforated tube for contaminated liquid corresponding thereto constituting a unit,
 pads of absorbent material removably positioned against both faces of each unit so as to enclose the series of radially spaced spiral turns alternately forming portions of the tube and the perforated tube comprising the unit, said pads of absorbent material being wetted by liquid escaping from said perforated tubes,
 a vapor delivering nozzle leading heated vapor out of said vaporizer unit,
 said pads of absorbent material cooperating with the casing of said vaporizer unit to define therewith a passage in the casing of said vaporizer unit communicating with said vapor delivering nozzle and into which vapor from the pads of wetted absorbent material may flow to the vapor delivering nozzle;
 a condenser unit comprising a casing associated with said vaporizer unit and having a nozzle arranged therein, the vapor delivering nozzle discharging vapor into the throat of the nozzle in the condenser casing,
 an internal wall within the condenser casing and disposed outwardly with respect to the nozzle in the condenser casing in surrounding relation thereto,
 means associated with the nozzle in the condenser casing and the internal wall within the condenser casing for circulating cooling medium within the condenser casing so as to cool the nozzle in the condenser casing and the internal wall within the condenser casing, and
 said internal wall within the condenser casing cooperating therewith to define a circulation path therebetween from the outlet end to the inlet end of said nozzle in the condenser casing for the vapor flowing through said nozzle in the condenser casing and effective to cause condensation of the said vapor; and
 means effective to continuously withdraw some of the condensed vapor from said condenser unit and deliver it as liquid to storage, to vent non-condensed vapor, and to return undelivered condensed vapor to said condenser unit.

4. Distillation apparatus for waste water and like contaminated liquids comprising:
a vaporizer unit generating vapor from the contaminated liquid,
means for circulating heating medium through said vaporizer unit, and
a vapor delivering nozzle leading heated vapor out of said vaporizer unit;
a condenser unit associated with said vaporizer unit and having a spherical case,
an internal spherical hollow wall within said case in substantially concentrically spaced relation thereto and cooperating therewith to define a circulation path therebetween for vapor to be cooled,
a hollow walled nozzle diametrically arranged within said internal spherical hollow wall in substantially coextensive relation therewith and having an intermediate throat portion between flared outer end portions, said hollow walled nozzle communicating with the circulation path at both its ends, said vapor delivering nozzle discharging vapor from said vaporizer unit into the throat portion of said hollow walled nozzle,
the hollow walled nozzle and the internal spherical hollow wall cooperating to define a continuous passage extending through the hollow walls thereof, and
means for circulating cooling medium through said continuous passage so as to cool said hollow walled nozzle and said internal spherical hollow wall for cooling the vapor in the spherical case of said condenser unit to cause condensation of the said vapor; and
means effective to continuously withdraw some of the condensed vapor from said condenser unit and deliver it as liquid to storage, to vent non-condensed vapor, and to return undelivered condensed vapor to said condenser unit.

5. Distillation apparatus as set forth in claim 4 wherein said hollow walled nozzle and said internal spherical hollow wall are comprised of an extended length of tubing which is spirally wound so as to form said hollow walled nozzle and said internal spherical hollow wall with the continuous passage extending through the hollow walls thereof being the passage through the tubing.

6. Distillation apparatus as set forth in claim 4 wherein the means effective to continuously withdraw some of the condensed vapor from said condenser unit and deliver it as liquid to storage, to vent non-condensed vapor, and to return undelivered condensed vapor to said condenser unit comprises
a centrifugal pump,
a first restricted passage connecting the intake of said pump to the circulation path for vapor to be cooled so as to be entered by particles of condensed vapor leaving the outlet of said hollow walled nozzle,
a pipe on said pump through which condensed vapor is delivered as liquid to storage,
a second restricted passage connecting said pump to the circulation path so as to return particles of condensed vapor to the circulation path adjacent the inlet of said hollow walled nozzle for recirculation, and
an escape pipe leading out of said pump through which non-condensed vapor is discharged.

7. A distillation apparatus for recovering relatively pure water from waste or similar contaminated water, said apparatus comprising:
a vapor chamber having inlet means coupled with a source of waste or otherwise contaminated water,
plural spirally wound perforated piping means positioned within said chamber and respectively connected at one end thereof with said inlet means to receive waste water therefrom, the respective other ends of said plural perforated piping means being closed,
heating fluid circulating means spirally interposed between successive spiral windings of each of said plural perforated piping means and coupled with a source of heating fluid,
pads of absorbent material in said vapor chamber and disposed inwardly thereof to define a space therebetween which surrounds said plural perforated piping means, said heating fluid circulating means, and said pads of absorbent material; said pads of absorbent material respectively enclosing each of said plural perforated piping means and the heating fluid circulating means spirally interposed between successive spiral windings thereof so that as waste water passes through the respective perforated piping means into said pads of absorbent material, heat from the heating fluid circulating means evaporates the moisture from said pads of absorbent material into said space surrounding said plural perforated piping means, said heating fluid circulating means, and said pads of absorbent material within said vapor chamber;
a condensation chamber,
means coupling said vapor chamber to said condensation chamber and defining a passage of relatively small diameter providing communication therebeteen so that evaporated moisture in said vapor chamber may flow into said condensation chamber, said condensation chamber having a tight spiral of cooling coils therein to cool the evaporated moisture passing over said coils for causing condensation of the said evaporated moisture to water,
said condensation chamber having outflow means through which the water condensate may be discharged from the condensation chamber, and
a pump coupled with said outflow means to receive the water condensate discharged therefrom and to pump the water condensate to an external storage means therefor.

8. A distillation apparatus for recovering relatively pure water from waste or similar contaminated water, said apparatus comprising:
a vapor chamber having inlet means coupled with a source of waste or otherwise contaminated water,
plural perforated piping means positioned within said chamber and respectively connected with said inlet means to receive waste water therefrom,
plural heating fluid circulating means respectively disposed in proximity to a corresponding one of said plural perforated piping means and coupled with a source of heating fluid,
pads of absorbent material in said vapor chamber and disposed inwardly thereof to define a space therebetween which surrounds said plural perforated piping means, said plural heating fluid circulating means, and said pads of absorbent material; said pads of absorbent material respectively enclosing each of said plural perforated piping means and the respective heating fluid circulating means in proximity thereto so that as waste water passes through the respective perforated piping means into said pads of absorbent material, heat from the heating fluid circulating means evaporates the moisture from said pads of absorbent material into said space surrounding said plural perforated means, said plural heating fluid circulating means, and said pads of absorbent material within said vapor chamber;
a condensation chamber communicating with said vapor chamber so that evaporated moisture in said vapor chamber may flow into said condensation chamber, said condensation chamber having cooling coils therein to cool the evaporated moisture passing over said coils for causing condensation of the said evaporated moisture to water, said condensation chamber having outflow means through which the water condensate may be discharged from the condensation chamber, and a pump coupled with said outflow means to receive the water condensate discharged therefrom and to pump the water condensate to an external storage means therefor.

References Cited
UNITED STATES PATENTS 3,169,102  2/1965  Weiswurm _____ 202—236
3,214,349  10/1965  Kehoe et al. _____ 203—11

NORMAN YUDKOFF, *Primary Examiner.*

J. SOFER, *Examiner.*